(12) United States Patent
Dörr

(10) Patent No.: US 9,010,524 B2
(45) Date of Patent: Apr. 21, 2015

(54) DEVICE AND METHOD FOR STOPPING AND/OR ALIGNING TRANSPORT GOODS ON A CONVEYING DEVICE, AND CONVEYING DEVICE

(71) Applicant: Thyssenkrupp System Engineering GMBH, Heilbronn (DE)

(72) Inventor: Hardy Dörr, Merchweiler (DE)

(73) Assignee: Thyssenkrupp System Engineering GmbH, Heilbronn (DE)

( * ) Notice: Subject to any disclaimer, the term of this patent is extended or adjusted under 35 U.S.C. 154(b) by 0 days.

(21) Appl. No.: 14/157,917

(22) Filed: Jan. 17, 2014

(65) Prior Publication Data

US 2014/0131167 A1    May 15, 2014

Related U.S. Application Data

(63) Continuation of application No. PCT/EP2012/064236, filed on Jul. 19, 2012.

(51) Int. Cl.

| B65G 13/12 | (2006.01) |
| B65G 47/24 | (2006.01) |
| B65G 47/22 | (2006.01) |
| B65G 47/88 | (2006.01) |
| B65H 9/06 | (2006.01) |

(Continued)

(52) U.S. Cl.
CPC ............... *B65G 47/24* (2013.01); *B21D 43/26* (2013.01); *B65G 47/22* (2013.01); *B65G 47/8815* (2013.01); *B65H 9/06* (2013.01); *B65G 2201/022* (2013.01); *B65G 2207/08* (2013.01); *B65H 5/066* (2013.01); *B65H 2404/154* (2013.01); *B65H 2511/232* (2013.01); *B65H 2701/111* (2013.01); *B65H 2701/1311* (2013.01); *B65H 2701/173* (2013.01); *F27D 3/026* (2013.01)

(58) Field of Classification Search
CPC ..... B65G 13/065; B65G 13/12; B65G 13/075
USPC ........... 198/782, 531, 459.7, 369.6, 345, 383, 198/600; 193/35 A, 35 SS
See application file for complete search history.

(56) References Cited

U.S. PATENT DOCUMENTS 3,305,072 A * 2/1967 Young .............................. 53/497
3,653,178 A * 4/1972 Bauer .............................. 53/543

(Continued)

FOREIGN PATENT DOCUMENTS

| CA | 2465986 A1 | 11/2005 |
| DE | 20207436 U1 | 8/2002 |
| WO | 2009113160 A1 | 9/2009 |

*Primary Examiner* — Leslie A Nicholson, III
*Assistant Examiner* — Keith R Campbell
(74) *Attorney, Agent, or Firm* — McNees, Wallace & Nurick LLC

(57) ABSTRACT

A device for stopping and/or aligning transport goods on a conveying device, in particular a roller conveyor, device has a main part and a stopping device that can be moved out of the main part into a conveying path of the conveying device in order to stop and/or align the transport goods that are transported along the conveying path. The stopping device comprises at least two separate stops that can be moved between a working position, which projects into the conveying plane, and a rest position, which is retracted with respect to the conveying plane, by means of a common actuator device.

18 Claims, 8 Drawing Sheets

(51) Int. Cl.
    *B65H 5/06* (2006.01)
    *F27D 3/02* (2006.01)
    *B21D 43/26* (2006.01)

(56) References Cited

U.S. PATENT DOCUMENTS

| | | | |
|---|---|---|---|
| 4,365,699 A * | 12/1982 | Dussud | 193/35 SS |
| 4,895,244 A | 1/1990 | Flaugher et al. | |
| 5,070,992 A * | 12/1991 | Bonkowski | 198/419.1 |
| 5,411,128 A | 5/1995 | Vild et al. | |
| 5,458,226 A * | 10/1995 | Nakao et al. | 198/379 |
| 5,477,655 A * | 12/1995 | Hawley | 53/251 |
| 5,727,365 A * | 3/1998 | Lashyro et al. | 53/448 |
| 6,019,211 A * | 2/2000 | Masciarelli, Jr. | 198/345.1 |
| 6,591,962 B2 * | 7/2003 | Miyake | 198/347.1 |
| 7,188,721 B1 * | 3/2007 | Wu et al. | 198/414 |
| 7,314,344 B2 * | 1/2008 | Chen et al. | 414/763 |
| 7,497,317 B2 * | 3/2009 | Chang et al. | 198/370.09 |
| 2005/0139450 A1 * | 6/2005 | Behnke et al. | 198/459.1 |

* cited by examiner

DEVICE AND METHOD FOR STOPPING AND/OR ALIGNING TRANSPORT GOODS ON A CONVEYING DEVICE, AND CONVEYING DEVICE

CROSS REFERENCE TO RELATED APPLICATIONS

This application is a Continuation of International Application No. PCT/EP2012/064236, filed on Jul. 19, 2012, entitled DEVICE AND METHOD FOR STOPPING AND/OR ALIGNING TRANSPORT GOODS ON A CONVEYING APPARATUS, AND CONVEYING APPARATUS, which application is hereby incorporated by reference in its entirety.

BACKGROUND

The present invention is based on a device for stopping and/or aligning transport goods on a conveying apparatus, in particular a roller conveyor, having a main part and a stopping apparatus which can be moved out of the main part into a conveying path of the conveying apparatus in order to stop and/or align the transport goods which are transported along the conveying path, wherein the stopping apparatus comprises at least two separate stop means, wherein the main part comprises at least one perforated panel, and wherein the stop means each comprise pin elements which are guided axially in holes in the at least one perforated panel.

It is generally known to provide roller conveyors with stopping apparatuses in order to stop transport goods which are transported by means of the roller conveyor, and/or to align said transport goods in a desired fashion. For example, document DE 202 07 436 U1 discloses a roller conveyor with a stopping apparatus which is arranged between two rollers and in which the stopping apparatus comprises a stopping element which can rotate about an axis and which is pivoted into the conveying path of the roller conveyor by means of a motor.

Such roller conveyors with stopping apparatuses are used, for example, in production lines for the industrial manufacture and processing of vehicle bodywork components. For the process of hot forming of sheet metal components in presses, in particular vehicle body sheet metal components in the automobile industry, annealing ovens are usually used to heat components to be hot formed to a hot forming temperature. In principle, such ovens are divided into three regions: input section, heating section with eventual temperature maintaining section and run-out section. The transportation of the components through the oven takes place on the specified roller conveyors. In order to transport the components further into the forming press, for example by means of commercially available industrial robots with gripping apparatuses, the vehicle body components usually have to be positioned in the longitudinal and transverse directions with respect to the conveying apparatus in the region of the run-out section. For this purpose, apparatuses with a stopper function have been known hitherto in the region of the run-out section, in which apparatuses individual, pneumatically driven stop cylinders equipped with stops are pivoted or moved linearly between the rollers of the run-out section in the direction of the conveying path and intercept the incoming production component at a plurality of suitable locations. The alignment of the production components transverse with respect to the conveying direction requires a further lifting or pivoting movement, for example by means of pneumatic swing clamps which are used as slides.

The actuation of the stoppers which is necessary when there are a plurality of production components and occurs in chronological succession is implemented, for example, by optical sensors for detecting production components. In this context, the stoppers which are arranged at the front in the conveying direction of the production components are firstly not actuated, with the result that they allow the first production component to pass, wherein subsequently the stoppers between this first production component and the following production component are moved up in order to stop the following production component, during which the first production component strikes against its own stoppers, located behind. The position of the stoppers is monitored, for example, inductively.

SUMMARY

An object of the present invention is to make available a device for stopping and/or aligning transport goods on a conveying apparatus which is of simple design compared to the prior art and can therefore be manufactured more cost-effectively and which, furthermore, permits flexible adaptation to the conveying conditions as well as to the desired stopping or positioning requirements. In addition, flexible adaptation to the geometry of the transport goods is to be made possible in a simple way.

This object is achieved with a device for stopping and/or aligning transport goods on a conveying apparatus, in particular a roller conveyor, which has a main part and a stopping apparatus which can be moved out of the main part and into a conveying path of the conveying apparatus in order to stop and/or align the transport goods which are transported along the conveying path, wherein the stopping apparatus comprises at least two separate stop means, wherein the main part comprises a perforated panel, and wherein the stop means each comprise pin elements which are guided axially in holes in the perforated panel, and wherein the stop means can be moved together, by means of a separate actuator apparatus, between a working position, which projects into the conveying plane, and a rest position, which is retracted with respect to the conveying plane.

The device according to the invention has, compared to the prior art, the advantage that the device is of significantly more simple and more compact design, and can be manufactured more cost-effectively. This is achieved in that the stop means can be moved simultaneously between the rest position and the working position by means of the common actuator apparatus. In contrast to the prior art, a separate individual drive is therefore not required for each stopping apparatus, as a result of which, on the one hand, the manufacturing costs of the device are lowered and, on the other hand, it is possible to completely dispense with complicated time-dependent individual actuation of the various individual drives. Instead, a multiplicity of stop means are moved simultaneously in the direction of their working position by the common actuator apparatus, by means of a common drive movement of the actuator apparatus. The device is preferably integrated into a conveying apparatus. Alternatively it is conceivable that the device can, in order to retrofit a conveying apparatus, be mounted on an existing and conventional conveying apparatus or is mounted in a stand-alone fashion, for example under a conveying apparatus. By incorporating the stop means in holes in the perforated panel, the stop means are secured comparatively firmly with respect to mechanical forces which act on the stop means parallel to the conveying plane (caused by the transport goods impacting against the stop means). In particular, an undesired movement of the stop means, caused by overloading, from the working position into the rest position is not possible, in contrast to the pivotable stop means which are known from the prior art. The main part is preferably arranged essentially between the actuator apparatus and the conveying plane, in a direction which is perpendicular with respect to the conveying plane. The use of a separate actuator apparatus has the advantage that an actuator which is individually adapted to the transport goods to be transported can be used without the entire unit composed of the base plate and stop means having to be changed for the purpose of adaptation to the transport goods. In particular, the actuator apparatus or the further perforated panel of the actuator unit can easily be exchanged, wherein the stop unit remains unchanged.

Advantageous refinements and developments of the invention can be found in the dependent claims as well as the description with reference to the drawing.

According to one preferred embodiment of the present invention there is provision that the stop means can be moved in a translatory fashion perpendicularly with respect to a conveying plane of the conveying apparatus, between the working position and the rest position, with the result that in contrast to the prior art no pivoting movement is necessary for this. The movement of the stopping apparatus therefore advantageously has no movement components in the conveying direction, with the result that comparatively stable and precise positioning of the stopping apparatus in the conveying plane can be achieved. Even at high conveying speeds and with comparatively heavy transport goods, reliable and stable stopping and positioning of the transport goods is therefore ensured, since the stop means always remain positionally and mechanically secured along the conveying path.

According to one preferred embodiment of the present invention there is provision that the device comprises a multiplicity of stop means which are arranged in a plane, parallel to the conveying plane, in an essentially uniformly distributed dot matrix. Owing to the multiplicity of uniformly arranged stop means, the device can advantageously be adapted to any desired form or size of transport goods and to any desired alignment parameters. However, owing to a corresponding configuration of the device in each case just one part of the stop means is moved from the rest position into the working position by the actuator apparatus, while the stop means which are not required always remain in the rest position in this configuration. In this way, the device can be adapted to different geometries and dimensions of transport goods in an extremely flexible and versatile fashion. The stop means are preferably constructed in the form of a nail bed, wherein only those stop means which are needed for the actual application are moved into the working position.

According to one preferred embodiment of the present invention there is provision that the stop means are elastically prestressed in the direction of their respective rest position. In order to operate the device, only one common means is advantageously necessary, which means only ever moves, in a flexible way, the stop means, required in the current configuration, into the working position. Separate individual actuation of the stop means is therefore not necessary. In addition, there is preferably provision that the pin elements are each encapsulated in a sleeve and are mounted in an axially displacement fashion within the sleeve. The sleeve is then attached in the hole of the perforated panel and the pin element is prestressed in a spring-elastic fashion into the rest position within the sleeve. The spring is arranged between the sleeve wall and the pin element. According to one preferred embodiment of the present invention there is provision that the actuator apparatus preferably has a multiplicity of tappets which can be moved in a translatory fashion in order to move the pin elements perpendicularly with respect to the conveying plane. Deflection of the stop means in the working position is therefore advantageously possible without adjacent stop means necessarily also being displaced into the working position.

According to one preferred embodiment of the present invention there is provision that the actuator apparatus comprises at least one or more further perforated panels which are embodied as a matrix and to which the tappets are attached, and wherein the perforated panels can be moved simultaneously or in groups in the direction of the conveying plane by means of a drive means. The tappets are preferably attached detachably to the perforation matrix or further perforated panels by means of a frictional and positive connection. For example, it is conceivable that the tappets are attached in corresponding holes of the further perforated panels by means of a screw connection or bayonet connection. In order to reconfigure the device, all that is therefore necessary is merely to release the tappets from the further perforated panels and, if appropriate, correspondingly position the tappets in other holes in the further perforated panels. Alternatively, it is also conceivable that the further perforated panel is simply exchanged and replaced by another further perforated panel which already has a matrix of tappets which is specifically adapted to the transport goods to be transported. It is also conceivable that the further perforated panel is correspondingly offset, for example in defined intermediate grids. The further perforated panels preferably have a multiplicity of holes which are arranged in a pattern which is essentially congruent with the dot matrix of the stop means in a direction perpendicular to the conveying plane. By arranging the tappets in corresponding holes it is therefore possible to actuate any desired combination of stop means by moving the perforated panel. In particular, the device can be adapted to different conveying conditions or transport goods geometries without exchanging stop means and solely by offsetting the tappets on the further perforated panels or exchanging the perforated panels in a product-specific fashion or offsetting the perforated panels in defined intermediate grids.

According to one preferred embodiment of the present invention there is provision that the tappets are attached to the further perforated panels in such a way that they can be freely configured in terms of their position in a plane parallel to the conveying plane and/or in terms of their relative position perpendicularly with respect to the conveying plane. The device is preferably embodied in such a way that by correspondingly offsetting the tappets relative to further perforated panels or exchanging the perforated panels in a product-specific fashion or offsetting the perforated panels in defined intermediate grids it is possible to move any desired configuration of stop means between the rest position and the working position by means of the common actuator apparatus.

According to one preferred embodiment of the present invention there is provision that the drive means comprises a cam which can rotate about a rotational axis which extends parallel to the conveying plane. The further perforated panels are preferably moved in the direction of the conveying surface by means of the cam, with the result that the tappets which are correspondingly attached to the further perforated panels also move in the direction of the conveying surface and therefore the stop means which are each arranged congruently with respect to the tappets perpendicularly with respect to the conveying plane are displaced into their working position. Turning the cam back or turning it further causes the stop means to move back into their rest position automatically owing to their spring loading.

According to one preferred embodiment of the present invention there is provision that the cam has a circumference with different curved gradients, wherein the different curved gradients are particularly preferably provided for controlling the tappets with different speeds. It is advantageously possible to control the speeds when raising the tappets at a constant drive rotational speed by different curved gradients on the circumference of the cam, and therefore to implement different moving-out times of the stop means when the stop means are activated. It is therefore advantageously possible to react, for example, to changes in the distance between the transport goods.

According to a further preferred embodiment there is provision that the main part which holds the stop means forms, together with the stop means, a stop unit, wherein the actuator apparatus forms, together with the tappets, an actuator unit which is separated from the stop unit, wherein the stop unit and the actuator unit can be exchanged independently of one another and in a modular fashion. The stop unit can therefore advantageously be operated with different actuator units, as a result of which particularly flexible and rapid adaptation of the device to different transport goods can advantageously be carried out. In order to adapt the device all that is necessary is to reconfigure or exchange the further perforated panel, having the tappet pattern, of the actuator unit. In order to exchange the further perforated panel, which is equipped with an individual configuration of tappets, the actuator unit can preferably be pulled out of the device in a drawer-like fashion parallel to the conveying plane.

According to a further preferred embodiment there is provision that in order to align transport goods in the conveying plane at least one stop means can be moved in a transverse direction which is perpendicular to the conveying direction and parallel to the conveying plane. A movement of the stop means perpendicular to the conveying direction is therefore advantageously made possible, as a result of which the conveyed transport goods can be displaced in the conveying plane, for example in an aligned, rotated or lateral fashion.

According to a further preferred embodiment there is provision that the main part has at least one displacement means which extends in the transverse direction and which is guided so as to be movable in the transverse direction in a guide of the main part, wherein the at least one stop means is attached to the displacement means. By displacing the displacement means, all the stop means which are attached to the displacement means are advantageously moved together in the transverse direction. It is conceivable that in a home position the stop means are inserted into the grid of the other stop means arranged on adjacent main parts. The displacement means comprises, in particular, a displaceable receiving bar, extending in the transverse direction, for the stop means, wherein the stop means are received in an axially displaceable fashion in receiving holes in the receiving bar in the direction perpendicular to the conveying plane, and the stop means can therefore be moved from the rest position into the working position by the separate actuation apparatus. The stop means here are also preferably spring-elastically prestressed into the rest position. The displacement means is preferably moved relative to the guide by means of a servomotor or a linear motor. The displacement means can be mounted, for example, as a displaceable carriage in the guide. The displacement means has a multiplicity of holes arranged in a row in the transverse direction, wherein the stop means which is embodied as a pin element is guided axially in one of the holes. The displacement of the displacement means ensures that all the stop means guided on this displacement means are moved in the transverse direction.

According to a further preferred embodiment there is provision that the main part has at least one further displacement means, wherein the displacement means and the further displacement means are arranged in a line parallel to the transverse direction and can be displaced linearly independently of one another in the transverse direction. At least two stop means which are located at the same height in the conveying direction can therefore advantageously be moved independently of one another. In this way, transport goods can be secured or aligned between two stop means which are to be moved toward one another. For this purpose, at least one stop means is arranged on the displacement means and at least one stop means is arranged on the further displacement means. The stop means are advantageously moved together by the separate actuation apparatus. It is also conceivable that a multiplicity of displacement means are arranged at the height of the conveying direction.

According to a further preferred embodiment there is provision that the actuator apparatus has an actuator bar which extends parallel to the displacement means and can be moved by motor in the direction of the displacement means in the perpendicular direction with respect to the conveying plane, in order to transfer the at least one stop means from the rest position into the working position. The stop means which are arranged on the displacement means are advantageously not moved from the rest position into the working position by the tappets (but this would also at least be conceivable in the home position) but instead by means of the actuator bar which extends parallel to the transverse direction. This has the advantage that when the displacement means and therefore also the stop means move in the transverse direction, the stop means move only along the actuator bar, and therefore driving of the stop means is also made possible. The stop means therefore always remain congruent with the actuator bar in a direction perpendicular to the conveying plane. In this way, in particular simultaneous movement of the stop means into the working position and displacement of the stop means in the transverse direction are made possible. Alternatively it is conceivable that a coupling arm is arranged between the actuator bar and the displacement means, as a result of which the actuator bar is moved along with the displacement means which move transversely with respect to the transverse direction. In this case, tappets are preferably arranged in receiving holes in the actuator bar, which holes are arranged in the direction perpendicular to the conveying plane, congruently with those stop means which are to be moved from the rest position into the working position. It is alternatively conceivable that the actuator bar has receiving holes for receiving the end regions of the pin elements, as a result of which positively locking coupling between the pin elements and the actuator bar is achieved with respect to a movement parallel to the transverse direction.

A further subject matter of the present invention is a device arrangement having at least two devices according to the invention for stopping and/or aligning transport goods on a conveying apparatus, wherein the at least two devices can be moved relative to one another in a plane parallel to the conveying plane. Advantageously, in the device arrangement according to the invention not only is the stop means moved out from the rest position into the working position perpendicularly with respect to the conveying plane but, furthermore, the stop means, which project into the conveying path, can be moved parallel to the conveying plane. It is conceivable, for example, that in order to align transport goods two stop means are moved into the working position, with the result that the transport goods are located between the two stop means and subsequently the two stop means are moved toward one another parallel to the conveying plane so that the transport goods are clamped in a positively locking fashion between the two stop means and are therefore positioned precisely.

A further subject matter of the present invention is a conveying apparatus, in particular roller conveyor, for moving transport goods along a conveying path which has a multiplicity of rotatable support rollers for receiving the transport goods, wherein the conveying apparatus has a device according to the invention for stopping and/or aligning the transport goods. A conveying apparatus with a device for stopping and/or aligning the transport goods is therefore advantageously made available with which the abovementioned advantages, such as a simple and cost-effective design and simplified actuation, can be achieved. In addition, flexible adaptation of the conveying apparatus to different transport goods geometries, conveying conditions and desired stopping requirements and positioning requirements is made possible. As a result, in particular, the required interruption time when resetting the conveying apparatus to transport goods of different shape or size is considerably shortened compared to the prior art. The stop means are preferably each arranged in a plane parallel to the conveying plane, between two adjacent support rollers. In the working position, the stop means are arranged here, in particular, in a position which projects beyond the support rollers and into the conveying path, while in the rest position the stop means are arranged in a position which is retracted with respect to the conveying path. In the retracted position, in particular the stop means do not project beyond the support rollers and into the conveying path, with the result that transport goods can pass by the retracted stop means along the conveying path without being impeded.

According to one preferred embodiment of the present invention there is provision that the conveying apparatus has at least two devices according to the invention for stopping and/or aligning the transport goods, wherein the at least two devices can be moved relative to one another in a plane parallel to the conveying plane, in particular by means of a further cam drive.

A further subject matter of the present invention is a method for stopping and/or aligning transport goods on a conveying apparatus, wherein transport goods are conveyed along a conveying path by means of support rollers, wherein stop means are moved together by means of an actuator apparatus perpendicularly with respect to a conveying plane from a rest position, which is retracted with respect to the conveying path, into a working position, which projects into the conveying path, and wherein the movement of the transport goods along the conveying path is stopped by mechanical contact between the stop means and the transport goods and/or the transport goods are aligned relative to the conveying path.

Further details, features and advantages of the invention can be found in the drawings and in the following description of preferred embodiments with reference to the drawings. The drawings illustrate here merely exemplary embodiments of the invention which do not restrict the essential inventive concept.

DETAILED DESCRIPTION

In the various figures, identical components are always provided with the same reference symbols and are therefore also generally each specified or mentioned only once.

Figure 1:
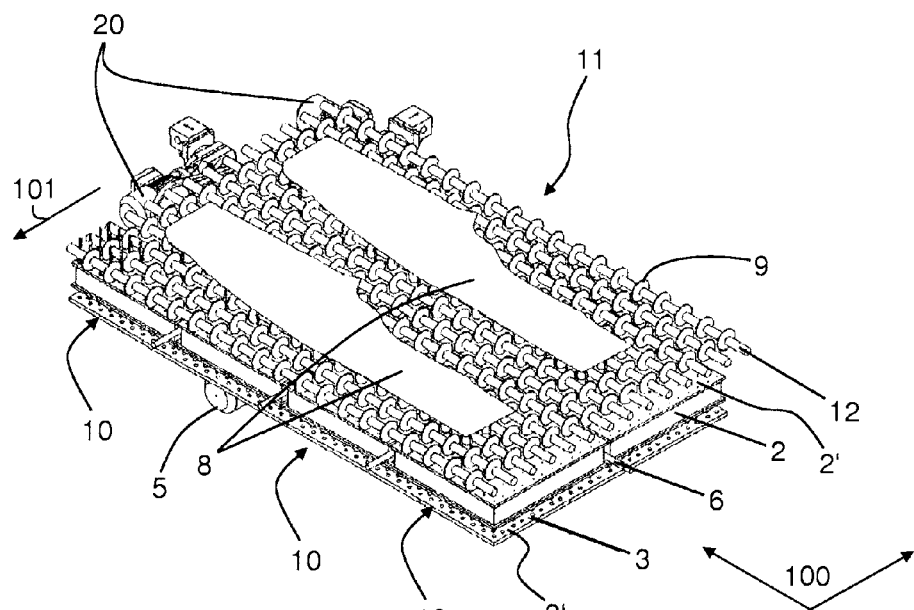
FIG. 1 shows a schematic perspective view of a multiplicity of devices according to an exemplary embodiment of the present invention.

FIG. 1 illustrates a schematic perspective view of a multiplicity of devices 10 according to an exemplary embodiment of the present invention, and of a device arrangement and of a conveying apparatus 11, each according to an exemplary embodiment of the present invention.

The conveying apparatus 11 comprises a roller conveyor. The roller conveyor is composed of a multiplicity of support rollers 9, which are each arranged on shafts 12 running parallel to one another. The support rollers 9 are provided for supporting or receiving transport goods 8, in the present example of the vehicle bodywork components, and for transporting the transport goods 8 in a conveying direction 101 extending along a conveying plane 100. The shafts 12 are either mounted so as to be freely rotatable and/or are driven by means of a drive motor (not represented) in such a way that the transport goods 8 are driven on the basis of frictional forces, acting between the support rollers 9 and the transport goods 8, so as to move in the conveying direction 101. The conveying apparatus 11 also has devices 10 for stopping and aligning the transport goods 8 on the conveying apparatus 11.

The devices 10 each comprise a cartridge-like main part 2, which is embodied in the form of a perforated panel 2', as well as stop means 1, which are embodied in the form of pin elements 1' (not shown in FIG. 1 for perspective reasons). The pin elements 1' are guided in the holes of the perforated panel 2' in such a way that the pin elements 1' can be moved in a translatory fashion relative to the perforated panel 2' in a direction perpendicular with respect to the conveying plane 100. The pin elements 1' can be displaced between a working position, in which the pin elements 1' protrude, in the perpendicular direction, beyond the support rollers 9 and into the conveying path, and a rest position, in which the pin elements 1' are in a position which is retracted with respect to the working position, i.e. the pin elements 1' do not project in the perpendicular direction beyond the support rollers and into the conveying path. The main part 2 therefore functions as a pin carrier. In the rest position, transport goods 8 can pass the stop means 1 without being impeded, while in the working position transport goods 8 cannot pass the stop means 1 without being impeded but instead are preferably stopped by the stop means 1 or correspondingly aligned relative to the conveying apparatus 11. Each pin element 1' is also configured with a compression spring 7, which compression springs 7 each prestress the pin elements 1' elastically into their rest position. The pin elements 1' and the corresponding holes in the perforated panel 2' are arranged distributed uniformly in the form of a dot matrix in a plane parallel to the conveying plane 100, i.e. are arranged in rows "in the manner of a nail bed". In this way, stop means 1 can be moved out individually or in groups at any virtually any location in the conveying plane 100, with the result that any stop means configurations, stopping configurations or aligning configurations which are individually adapted to the conveying apparatus 11 or to transport goods 8, can be implemented by correspondingly displacing a multiplicity of stop means 1 from the rest position into their working position. In particular, there is no need to exchange stop means 1 in order to convert the device 10 to other transport goods 8, but instead all that is necessary is to move out other stop means 1. In particular, all the stop means 1 therefore always remain in the devices 10.

Each of the devices 10 also has an actuator apparatus 3 for jointly moving the stop means 1 of a device 10 from the rest position into its working position. The actuator apparatus 3 comprises in each case one or more further perforated panels 3' which are embodied as a matrix and which is/are to be moved in the perpendicular direction and in the direction of the main part 2 by means of a drive means 5 which is embodied in the form of a cam 5'. The further perforated panels 3' have here a multiplicity of holes which are distributed uniformly in a plane parallel to the conveying plane 100 and which in the vertical direction are arranged, in particular, congruently with respect to the holes formed in the perforated panel 2' or with respect to the stop means 1. The actuator apparatus 3 also has tappets 4 which are freely configurable and are attached, depending on the application, in specific holes of the perforation matrix or further perforated panels 3'. In the case of an upward movement of the further perforated panels 3' caused by the drive means 5, the tappets 4 are therefore moved together with the further perforated panels 3' in the direction of the conveying apparatus 11. As a result, the ends of the tappets 4 which face the main part 2 enter into mechanical contact with the corresponding ends of the pin elements 1' facing the further perforated panels 3', as a result of which these pin elements 1' are moved from their rest position into their working position, counter to the spring force of the compression springs 7. The other pin elements 1' remain in their rest position. Depending on the arrangement of the tappets 4 on the further perforated panels 3', different pin elements 1' are therefore activated. The actuation of the pin elements 1' and their product reference are achieved by the quickly exchangeable or quickly configurable matrix composed of tappets 4 which are attached to the further perforated panels 3' underneath the pin elements 1' which merely move up the production-relevant pin elements 1' and those pin elements 1' which are not required to stop or to center the transport goods 8 which are present in discrete form in their rest position. The tappets 4 are preferably detachably screwed in the holes of the further perforated panels 3'. Each of the devices 10 is therefore freely configurable by simply shifting the tappets 4 on the further perforated panels 3' or by exchanging the further perforated panels 3'. The tappets 4 can be positioned here, in particular, in different positions parallel to the conveying plane 100 and perpendicularly with respect to the conveying plane 100. If the tappets are provided in different positions in the perpendicular direction, the pin elements 1' are moved from the rest position into the working position by the common actuator apparatus 3 at different times, with the result that a chronological sequence can easily be freely defined. Changing moving-out speeds of the pin elements 1' can be generated by different curved gradients at the circumference of the cam 5'.

The main part 2 forms, together with the stop means 1, a stop unit, wherein the actuator apparatus 3 forms, together with the tappets 4, an actuator unit which is separate from the stop unit. The stop unit and the actuator unit can therefore be exchanged independently of one another and in a modular fashion. The stop unit can therefore be operated with different actuator units 3, as a result of which the device 10 can be adapted particularly flexibly and quickly to differently shaped transport goods 8. In order to adapt the device 10, the further perforated panel 3', having the perforation pattern, of the actuator unit merely has to be reconfigured or exchanged. In order to replace the further perforated panel 3', which is equipped with an individual configuration of tappets 4, the actuator unit can preferably be pulled out of the device 10 parallel to the conveying plane 100 in the manner of a drawer.

The devices 10 are optionally arranged one next to the other in the form of a device arrangement according to an exemplary embodiment of the present invention parallel to the conveying plane 100. The adjacent devices 10 can each be displaced relative to one another and parallel to the main plane 100 by means of a further cam drive 6 here. In this way, the stop means of a device 10 can be moved relative to the stop means 1 of an adjacent device 10. The device arrangement is preferably constructed here in a modular fashion from any desired number of devices 10, depending on the application. By a corresponding selection and combination of a specific number of devices 10, the device arrangement can be adapted in a flexible way to the requirements of any desired conveying apparatus 11.

Figure 2:
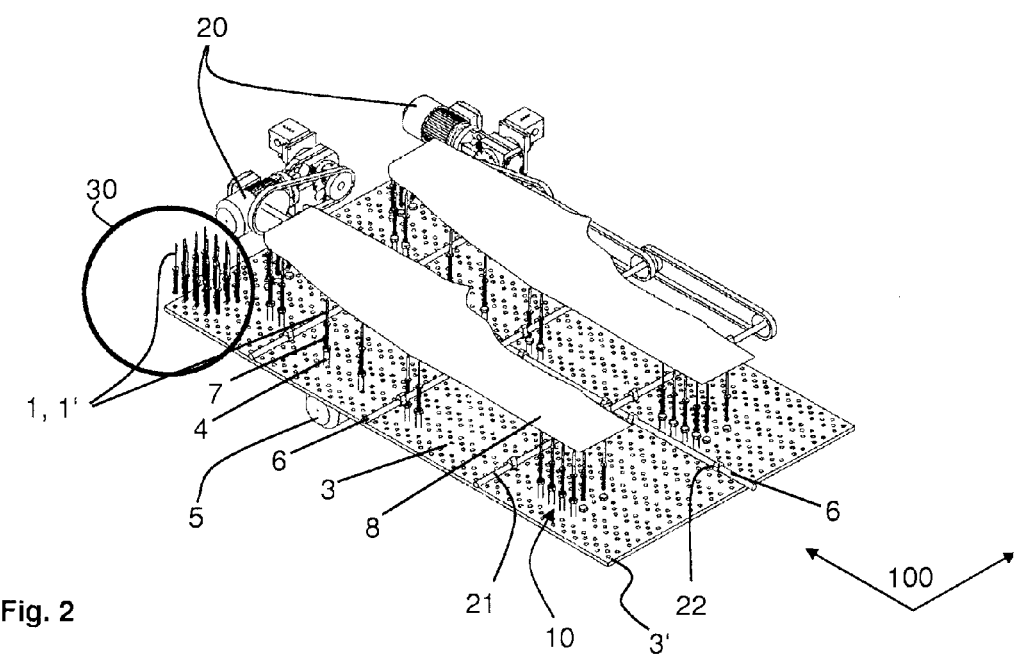
FIG. 2 shows a schematic perspective view of the devices according to the exemplary embodiment of the present invention.

FIG. 2 illustrates a schematic perspective view of the devices 10 according to the exemplary embodiment of the present invention. The devices 10 which are illustrated in FIG. 2 are identical here to the devices 10 illustrated in FIG. 1, wherein the shafts 12, the support rollers 9 and the main parts 2 are not illustrated, merely for reasons of clarity. In FIG. 2, the pin elements 1' together with the respective compression springs 7 of every device 10 can therefore be seen. Some of the pin elements 1' are activated by the tappets 4 provided on the respective further perforated panels 3'. In each case the cam drives 6, which comprise further shafts 21 and further cams 22 arranged on the further shafts 21 respectively run between adjacent devices 10. The cam drives 6 are driven by means of motors 20. Adjacent devices 10 are shifted relative to one another by rotation of the further cams 22 by means of the motors 20. There is preferably provision that adjacent devices 10 are spring loaded toward one another by means of further spring elements (not illustrated). The adjacent devices 10 are then spaced apart from one another counter to these spring forces by the rotation of the further cams 22. In this way it is possible to bring about the relative movement between the pin elements 1' of various devices 10 parallel to the conveying plane 100. It is conceivable that by means of the further cams 22 the devices 10 are firstly spaced apart from one another counter to the spring forces, and subsequently the pin elements 1' are moved from the rest position into the working position if transport goods 8 are located between the pin elements 1', and finally the further cams 22 are moved into a perpendicular position, with the result that adjacent devices 10 move toward one another owing to the spring forces, and therefore the pin elements 1', which can move toward one another and are in their working position, engage in a positively locking fashion around the transport goods 8 and are therefore precisely positioned. It is also conceivable, as already in the case of the cams 5' for the upward and downward movement of the tappets 4 and of the stop means 1, to have a different configuration of the curved gradient of the further cams 22 with the objective of moving various devices 10 with differing strokes and speeds relative to one another. In this way very different stop means relationships and alignment relationships can be adapted individually to transport goods 8.

Figure 3:
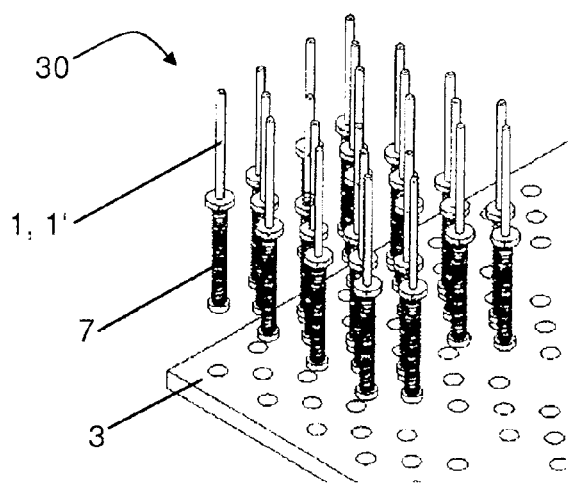
FIG. 3 shows an enlarged detail of the perspective view of the device according to the exemplary embodiment of the present invention.

FIG. 3 illustrates an enlarged detail 30 of the perspective view of a device 10, illustrated in FIG. 2, according to the exemplary embodiment of the present invention. In the detail 30, the pin elements 1' of a device 10 and the compression springs 7 which act on the pin elements 10 are illustrated in a detailed fashion.

Figure 4:
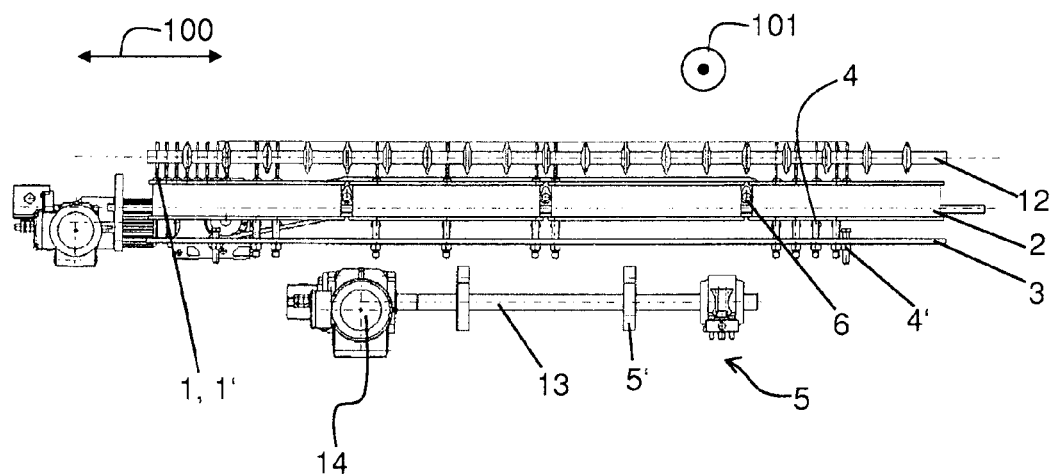
FIG. 4 shows a schematic side view of the multiplicity of devices according to the exemplary embodiment of the present invention.

FIG. 4 illustrates a schematic side view of the multiplicity of devices 10 according to the exemplary embodiment of the present invention. This side view shows the drive means 5 which comprises a cam 5' which is arranged on a cam shaft 13. A rotation of the cam shaft 13 causes the cam 5' to apply force to one side, facing the drive means 5, of the further perforated panels 3' in the direction of the main part 2, as a result of which the tappets 4 are moved in the direction of the pin elements 1'. In the present embodiment, the device arrangement has a single further perforated panel 3' for a plurality of main parts 2, with the result that a multiplicity of pin elements 1' are activated jointly by different devices 10 solely by the movement of the one cam 5'. However, it is alternatively also conceivable that each of these devices 10 has a separate drive means 5 of this type, which only ever activates jointly a multiplicity of pin elements 1' of a single device 10. The cam shaft 13 is preferably driven by a further motor 14. In FIG. 4 it is also apparent that, at least by way of example, at least one specific tappet 4' is attached, offset with respect to the other tappets 4 in the perpendicular direction, to the further perforated panels 3'. This has the result that, when the perforated panels 3' are moved up, the pin element 1' which is assigned to this specific tappet 4' is moved into the working position with a chronological offset with respect to the other pin elements 1' activated by the tappets 4. The size of the offset in the perpendicular direction therefore determines the chronological offset when the pin elements 1' move from the rest position into the working position.

Figure 5:
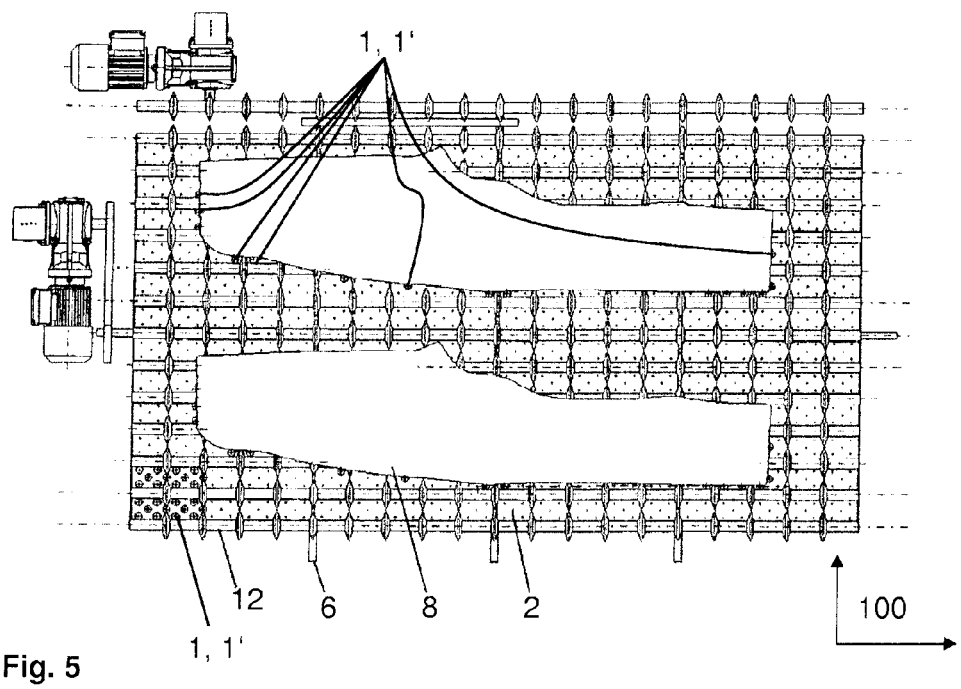
FIG. 5 shows a plan view of the multiplicity of devices according to the exemplary embodiment of the present invention.

FIG. 5 illustrates a schematic plan view of the multiplicity of devices 10, of the device arrangement and of the conveying apparatus 11, in each case according to the exemplary embodiment of the present invention. The devices 10 which are shown in FIG. 5 are identical here to the devices 10 illustrated in FIG. 1. In FIG. 5 it is apparent in this context that the two transport goods items 8, which in the present example are hot shaping vehicle bodywork components in a run-out section of an annealing oven, have been positioned by means of pin elements 1' which have been moved into their working position. Owing to the flexible configurability of the devices 10, the pin elements 1' are perfectly adapted to the individual external periphery of the transport goods 8 here.

FIGS. 6a to 6d illustrate, by means of schematic side views of the multiplicity of devices 10, a method according to the exemplary embodiment of the present invention.

Figure 6A:
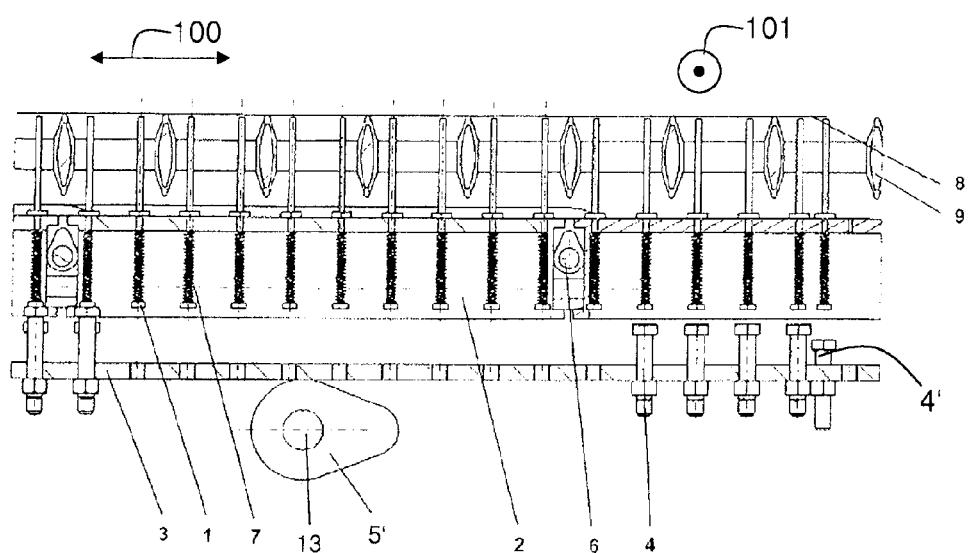
FIGS. 6a to 6d show a method according to the exemplary embodiment of the present invention by means of schematic side views of the multiplicity of devices.

In FIG. 6a, the cam 5' is located in a horizontal position parallel to the conveying plane 100, with the result that the further perforated panels 3' is in a "lower position" (i.e. between the further perforated panel 3' and the main parts 2 is a maximum distance). All the pin elements 1' are therefore located in their rest position owing to the spring forces respectively applied by the compression spring 7, with the result that the transport goods 8 can be transported unimpeded in the conveying direction 101 by means of the support rollers 9.

Figure 6B:
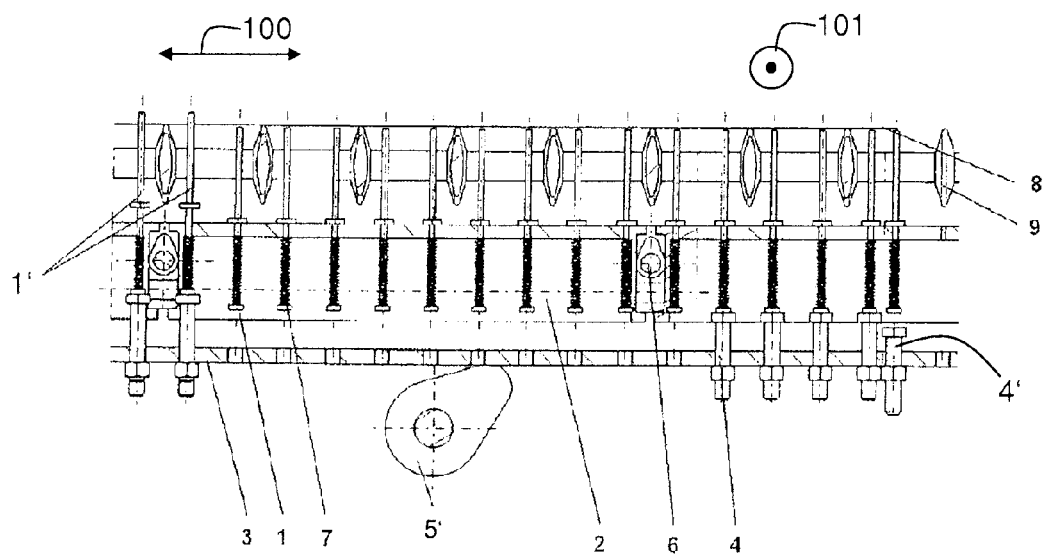

In FIG. 6b, the cam 5' is rotated with respect to the position illustrated in FIG. 6a in such a way that the further perforated panels 3' is shifted in the direction of the main parts 2. As a result, the tappets 4 which protrude most in the direction of the main part 2 engage in a positively locking fashion with the pin elements 1' assigned to them. The specific tappet 4' which is attached to the other perforated panels 3' offset with respect to the other tappets 4 in the perpendicular direction is, on the other hand, still spaced apart from the pin element 1' assigned to it.

Figure 6C:
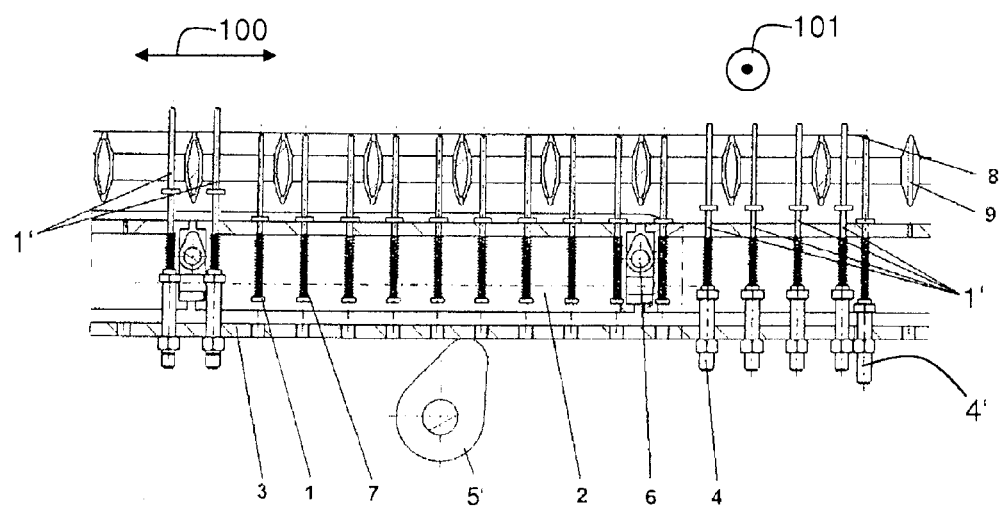

In FIG. 6c, the cam 5' is rotated still further, with the result that those pin elements 1' which were already in contact with the tappets 4 in FIG. 6b have been moved from their rest position into their working position by means of the tappets 4. In addition, the specific tappet 4' has now also moved into positively locking engagement with the pin element 1' assigned to it.

Figure 6D:
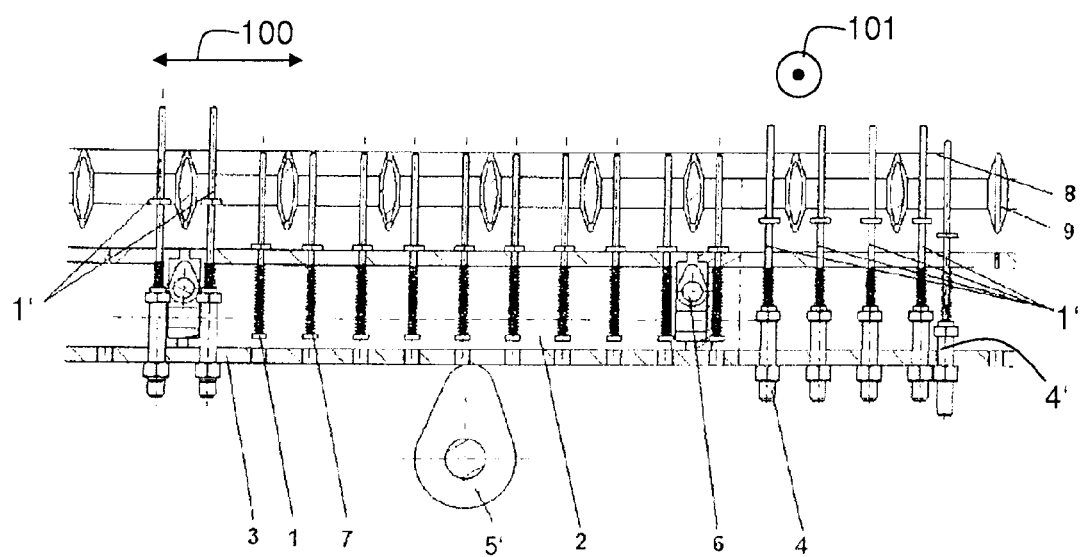

In FIG. 6d, the cam 5' is now aligned parallel to the perpendicular direction, as a result of which the further perforated panels 3' is in its "upper position" (i.e. the distance between the further perforated panels 3' and the main part 2 is minimal). In this position, the further perforated panels 3' has moved in the direction of the main parts 2 in such a way that the pin element 1' which is assigned to the specific tappet 4' has also been moved by means of the specific tappet 4' from its rest position into its working position. All the other pin elements 1', in whose position parallel to the conveying plane 100 there are no tappets 4 arranged on the further perforated panels 3', remain in their rest position. In this way, the pin elements 1' can be moved up with a chronological offset, for example when there are a plurality of production parts (also referred to as transport goods 8) conveyed successively from an oven, wherein the pin elements 1' are actuated with a chronological offset by tappets 4 of different heights on the further perforated panels 3' when the further perforated panel 3' is moved up continuously at the same time. In this context, the speed of the moved-up further perforated panels 3' is held in such a way that it can be varied by the cam 5', which preferably permits, owing to its curved gradient, individual groups of pin elements 1' to move up at different speeds.

The alignment of the transport goods 8 transversely with respect to the conveying direction 101 is achieved by the pin elements 1', which are moved into the working position, being moved laterally in different directions on the edges of the transport goods 8 after the transport goods 8 have stopped. In this context, the cam drive 6, which moves the segmented and spring-preloaded main parts 2 together or away from one another, is controlled correspondingly. The stroke length and speed are dependent on the gradient of the control cam 22.

Figure 7A:
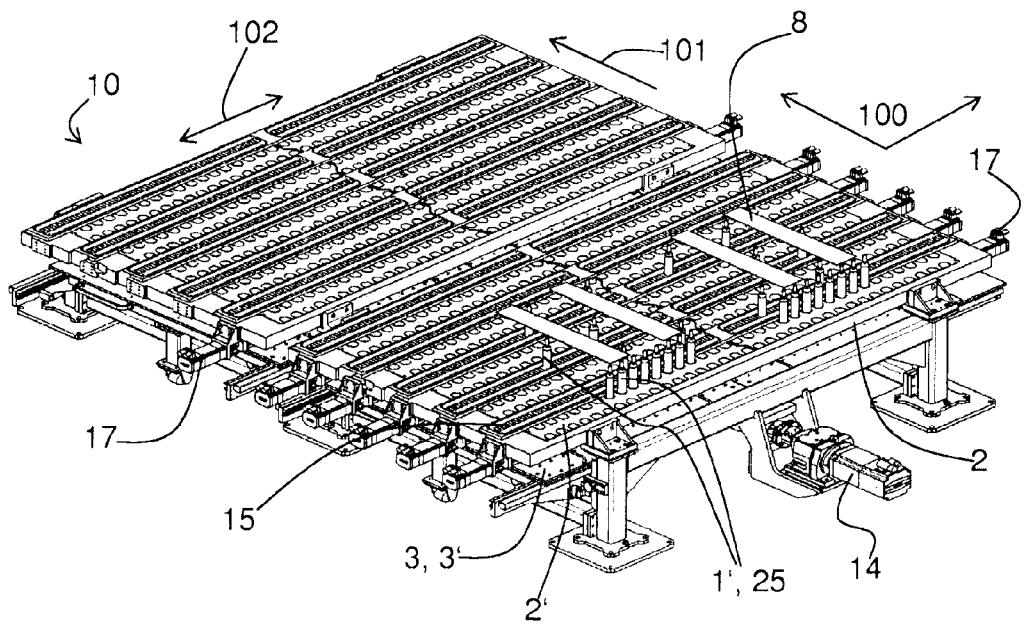
FIGS. 7a to 7c show schematic perspective and detailed views of a device according to a further exemplary embodiment of the present invention.
Figure 7B:
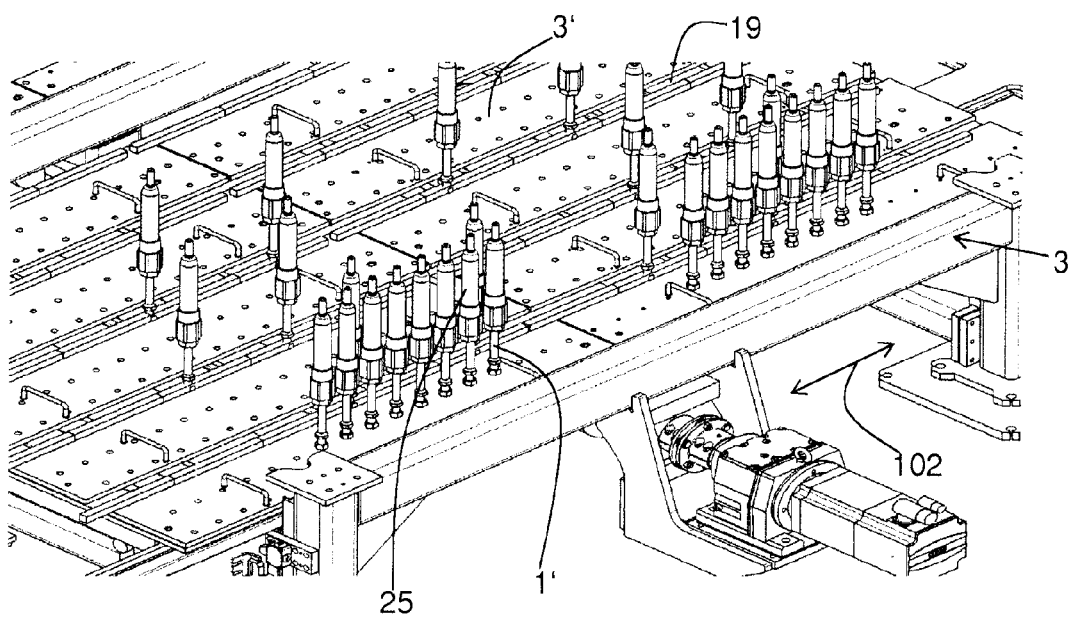
Figure 7C:
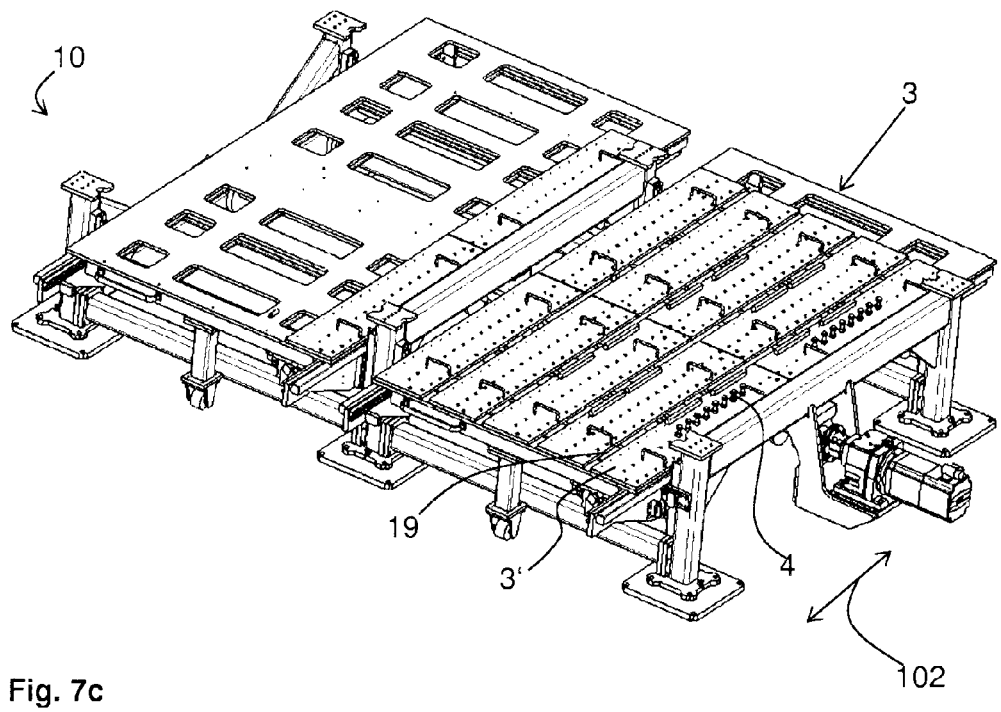

FIGS. 7a to 7c illustrate schematic perspective and detailed views of a device 1 according to a further exemplary embodiment of the present invention, and the further embodiment is essentially similar to the embodiment explained with reference to FIGS. 1 to 6d. The stop means which are embodied as pin elements 1' are, however, no longer guided only in holes of a single, coherent perforated panel 2' but instead are partially also arranged on displacement means 15 which are embodied in the manner of a bar. For reasons of clarity, the support rollers of the roller conveyor are not illustrated in FIGS. 7a, 7b and 7c. The main part has both perforated panels 2' and separate displacement means 15, in each case for supporting the pin elements 1'. The perforated panels 2' and the displacement means 15 are arranged alternately in a plane parallel to the conveying plane 100 and in the conveying direction 101. The displacement means 15 are embodied so as to be displaceable in a transverse direction 102 which is perpendicular with respect to the conveying direction 101 and parallel to the conveying plane 100. The stop means 1 are guided here in an axially displaceable fashion in guide holes 18 of the displacement means 15. The device 10 has an electric servomotor 17 for each displacement means 15, which servomotor 17 drives, via a spindle drive 24, the displacement means 15 so that it moves in the transverse direction 102. The displacement means 15 are mounted here in a longitudinally displaceable fashion in a fixed guide 16. A detailed view of such an arrangement composed of the displacement means 15, guide 16, servomotor 17, spindle drive 24 and pin elements 1' is illustrated in FIG. 8.

FIGS. 7b and 7c illustrate the device 10 without a main part 2 in order to make available a detailed view of the actuator apparatus 3. In the present example, the actuator apparatus 3 comprises a multiplicity of further perforated panels 3', in whose holes the tappets 4 are arranged in a pattern adapted individually to the transport goods 8 to be transported. In addition, actuator bars 19 which extend in the transverse direction 102 are arranged between the further perforated panels 3'. The further perforated panels 3' and the actuator bars 19 can be moved by a common drive means 5 in the direction of the conveying plane 100, in a perpendicular direction with respect to the conveying plane 100. The common drive means 5 comprises, for example, a motor 14 whose drive shaft is connected to a cam 5' (see FIG. 4). The tappets 4 therefore enter into contact with the ends of the pin elements 1' which can be displaced axially in the perforated panels 2', as a result of which these pin elements 1' are moved through between the support rollers 9 and into the conveying plane 100. At the same time, the actuator bars 19 enter into contact with the end of those pin elements 1' which are guided in an axially displaceable fashion in the displacement means 15, as a result of which these pin elements 1' are also moved through between the support rollers 9 and into the conveying plane 100 and are therefore moved from the rest position into the working position. At the same time it is possible to move these pin elements 1' in their working position in the transverse direction 102 by means of a movement of the displacement means 15 (not illustrated in FIG. 7b). Owing to the bar-like embodiment of the actuator bars 19, extended in the transverse direction 102, the pin elements 1' remain here in contact with the actuator bars 19 and are not moved back into the rest position by the spring pretension during the displacement in the transverse direction 102. In this way, transport goods 8 can be aligned or rotated or displaced transversely with respect to the conveying direction 101 in the conveying plane 100. The actuator bars 19 are not moved in the transverse direction 102 here. However, it is alternatively also conceivable that the actuator bars 19 are also mounted so as to be displaceable in the transverse direction 102 and have receptacle holes in which in each case the end of the pin element 1' can be received as far as a stop. As a result, in the case of a movement of the displacement means 15 in the transverse direction 102 the actuator bar 19 moves along with the displacement means 15. In addition it is conceivable that the actuator bar 19 is coupled via a coupling arm to the spindle drive 24 or the displacement means 15 and is therefore driven to undergo a movement in the transverse direction 102 in synchronism with the displacement means 15.

Figure 8:
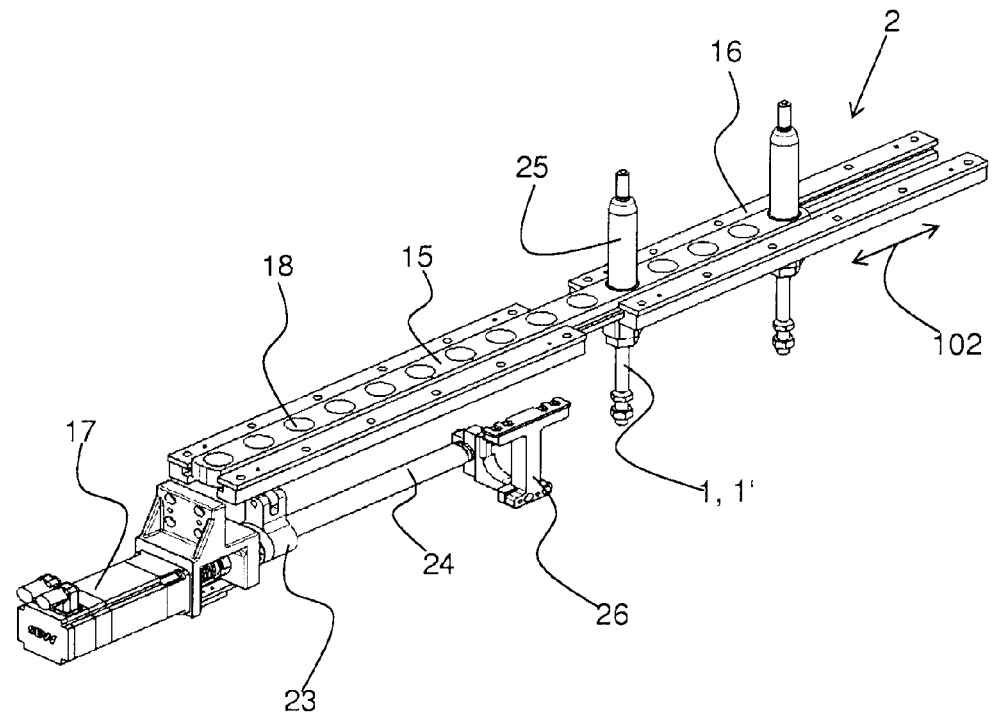
FIG. 8 shows a schematic perspective view of displacement means of the device according to the further exemplary embodiment of the present invention.

FIG. 8 illustrates in a detailed fashion a schematic perspective view of a displacement means 15 of the device 10 according to the further exemplary embodiment of the present invention. It is apparent that the displacement means 15 has a plurality of guide holes 18 in which pin elements 1' can be arranged according to the requirement. The displacement means 15 is mounted so as to be displaceable in the guide 16 in the manner of a carriage and can be moved in the transverse direction 102 by means of the servomotor 17. The servomotor 17 is for this purpose coupled to a spindle drive 24, wherein a spindle nut 23 which is provided with a corresponding internal thread runs on the spindle of the spindle drive 24. The spindle nut 23 is additionally coupled to the displacement means 15. Rotation of the spindle by means of the servomotor 17 therefore brings about a displacement of the spindle nut 23 in the transverse direction 102 and therefore a displacement of the displacement means 15. The free end of the spindle is also mounted in a bearing means 26. There is optionally provision that the servomotor 17, and therefore also the displacement means 15, is coupled via a coupling arm to the associated actuator bar 19 (not represented in FIG. 8), so that the actuator bar 19 and the displacement means 15 always carry out a synchronous movement in the transverse direction 102. As an alternative to the arrangement composed of the servomotor 17 and spindle drive 24, an implementation with an electric linear motor would also be conceivable.

Figure 9:
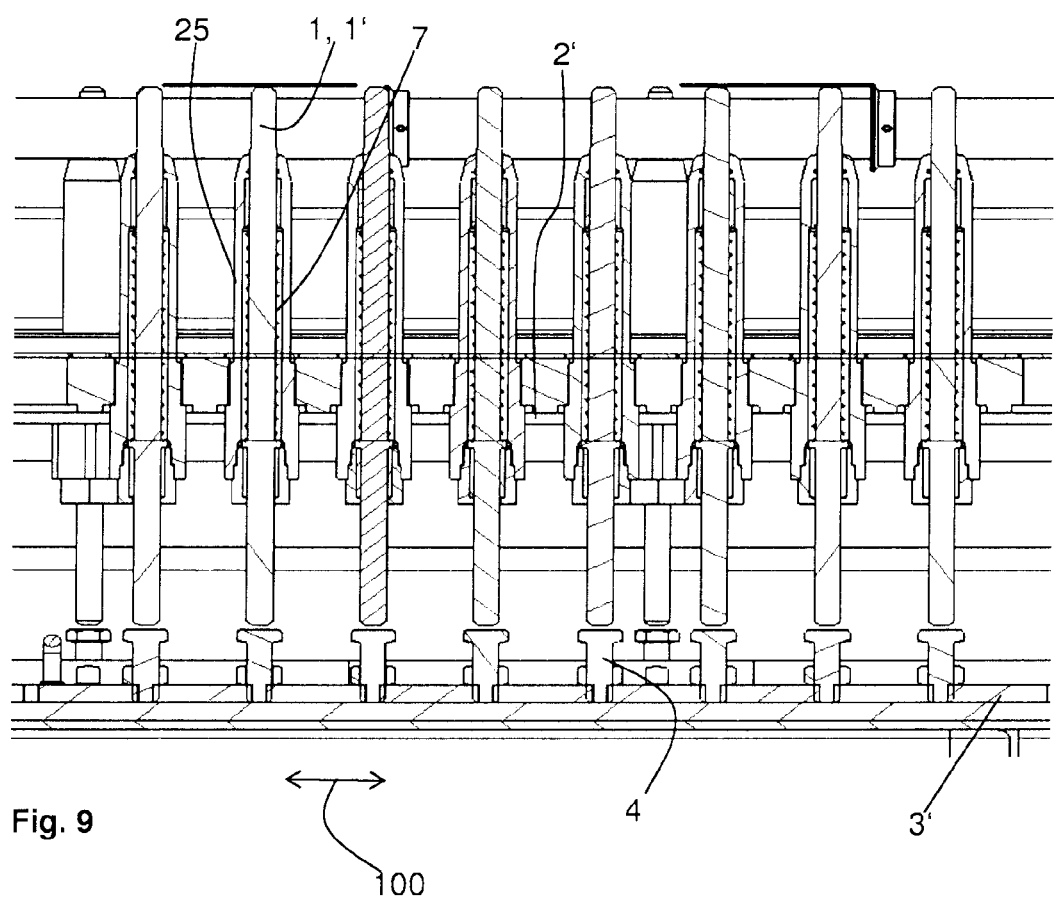
FIG. 9 shows an enlarged detail of a sectional view of the device according to the further exemplary embodiment of the present invention.

FIG. 9 illustrates an enlarged detail of a sectional view of the device 10 according to the further exemplary embodiment of the present invention. The sectional illustration illustrates the tappets 4 which are attached in the further perforated panels 3' and which, in the case of actuation, press on the ends of the pin elements 1' in order to move the pin elements 1' from the rest position into the working position counter to the spring force. In the present example, the pin elements 1' are encapsulated in sleeves 25, wherein the sleeves 25 are attached in the holes of the perforated panel 2' and the pin elements 1' are mounted so as to be axially displaceable relative to the sleeves 25. In each case the compression spring 7, which prestresses the pin element 1' into the rest position in a spring-elastic fashion, is arranged between the sleeves 25 and the pin element 1'.

The invention claimed is:

1. A device for stopping and/or aligning transport goods on a conveying apparatus, said device having a main part and a stopping apparatus which can be moved out of the main part into a conveying path of the conveying apparatus in order to stop and/or align the transport goods which are transported along the conveying path, wherein the stopping apparatus comprises at least two separate stop means, wherein the main part comprises at least one perforated panel, and wherein the stop means each comprise pin elements which are guided axially in holes in the at least one perforated panel, characterized in that the stop means are moved together, by means of a separate actuator apparatus, between a working position, which projects into the conveying plane, and a rest position, which is retracted with respect to the conveying plane, wherein the main part which holds the stop means form, together with the stop means, a stop unit, and wherein the actuator apparatus forms, together with the tappets, an actuator unit which is separated from the stop unit, wherein the stop unit and the actuator unit can be exchanged independently of one another and in a modular fashion.

2. The device as claimed in claim 1, wherein the stop means are moved in a translatory fashion perpendicularly with respect to a conveying plane of the conveying apparatus, between the working position and the rest position.

3. The device as claimed in claim 2, wherein the device comprises a multiplicity of pin elements which are arranged in a plane, parallel to the conveying plane, in an essentially uniformly distributed dot matrix.

4. The device as claimed in claim 3, wherein the actuator apparatus has a plurality of tappets which can be moved in translatory fashion in order to move the pin elements perpendicularly with respect to the conveying plane.

5. The device as claimed in claim 4, wherein the actuator apparatus comprises a matrix to which the tappets are attached, wherein the actuator apparatus comprises at least one further perforated panel which is embodied as a matrix and which is moved in the direction of the conveying plane by means of a drive means.

6. The device as claimed in claim 5, wherein the tappets are attached to the further perforated panel detachably and/or in such a way that they can be freely configured in terms of their position in a plane parallel to the conveying plane and/or in terms of their relative position perpendicularly with respect to the conveying plane.

7. The device as claimed in claim 5, wherein the drive means comprises a cam which can be rotated about a cam shaft which extends parallel to the conveying plane, wherein the cam has a circumference with different curve gradients, and wherein the different curve gradients are provided for controlling the tappets at different speeds.

8. The device as claimed in claim 1, wherein in order to exchange the further perforated panel, which is equipped with an individual configuration of tappets, the actuator unit can be pulled out of the device parallel to the conveying plane.

9. The device as claimed in claim 1, wherein, in order to align transport goods in the conveying plane, at least one stop means can be moved in a transverse direction which is perpendicular to the conveying direction and parallel to the conveying plane.

10. The device as claimed in claim 9, wherein the main part has at least one displacement means which extends in the transverse direction and which is guided so as to be movable in the transverse direction in a guide of the main part, wherein the at least one stop means is attached to the displacement means.

11. The device as claimed in claim 10, wherein the displacement means can be moved relative to the guide by means of a servomotor and/or linear motor, and/or wherein the displacement means has a multiplicity of guide holes arranged in a row in the transverse direction, wherein the stop means which is embodied as a pin element is guided axially in one of the guide holes.

12. The device as claimed in claim 10, wherein the main part has at least one further displacement means, wherein the displacement means and the further displacement means are arranged on a common line parallel to the transverse direction, and is displaced linearly independently of one another in the transverse direction.

13. The device as claimed in claim 10, wherein the actuator apparatus has an actuator bar which extends parallel to the displacement means and can be moved by motor in the direction of the displacement means in the perpendicular direction with respect to the conveying plane, in order to transfer the at least one stop means from the rest position into the working position.

14. A device arrangement comprising at least two devices, each of said devices having a main part and a stopping apparatus which can be moved out of the main part into a conveying path of the conveying apparatus in order to stop and/or align the transport goods which are transported along the conveying path, wherein the stopping apparatus comprises at least two separate stop means, wherein the main part comprises at least one perforated panel, and wherein the stop means each comprise pin elements which are guided axially in holes in the at least one perforated panel, characterized in that the stop means are moved together, by means of a separate actuator apparatus, between a working position, which projects into the conveying plane, and a rest position, which is retracted with respect to the conveying plane, wherein the main part which holds the stop means form, together with the stop means, a stop unit, and wherein the actuator apparatus forms, together with the tappets, an actuator unit which is separated from the stop unit, wherein the stop unit and the actuator unit can be exchanged independently of one another and in a modular fashion, wherein the at least two devices can be moved relative to one another in a plane parallel to the conveying plane.

15. A conveying apparatus, for moving transport goods along a conveying path which has a multiplicity of rotatable support rollers for receiving the transport goods, characterized in that the conveying apparatus has a device for stopping and/or aligning the transport goods, said device having a main part and a stopping apparatus which can be moved out of the main part into a conveying path of the conveying apparatus in order to stop and/or align the transport goods which are transported along the conveying path, wherein the stopping apparatus comprises at least two separate stop means, wherein the main part comprises at least one perforated panel, and wherein the stop means each comprise pin elements which are guided axially in holes in the at least one perforated panel, characterized in that the stop means are moved together, by means of a separate actuator apparatus, between a working position, which projects into the conveying plane, and a rest position, which is retracted with respect to the conveying plane, wherein the main part which holds the stop means form, together with the stop means, a stop unit, and wherein the actuator apparatus forms, together with the tappets, an actuator unit which is separated from the stop unit, wherein the stop unit and the actuator unit can be exchanged independently of one another and in a modular fashion.

16. The conveying apparatus as claimed in claim 15, wherein the stop means are each arranged in a plane parallel to the conveying plane, between two adjacent support rollers.

17. The conveying apparatus as claimed in claim 15, wherein in the working position the stop means are in a position in which they protrude beyond the support rollers and into the conveying path, and wherein in the rest position the stop means are arranged in a position in which they are retracted with respect to the conveying path.

18. The conveying apparatus as claimed in claim 15, wherein the conveying apparatus has at least two of said devices, wherein said at least two devices can be moved relative to one another in a plane parallel to the conveying plane.

* * * * *